(12) United States Patent
Freund et al.

(10) Patent No.: US 10,161,335 B2
(45) Date of Patent: Dec. 25, 2018

(54) OPERATING METHODS FOR INTERNAL COMBUSTION ENGINES

(71) Applicant: Continental Automotive GmbH, Hannover (DE)

(72) Inventors: Florian Freund, Bad Abbach (DE); Kia Hsu, Regensburg (DE); Gernot Schlintl, Regensburg (DE); Stefan Boisen, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 56 days.

(21) Appl. No.: 15/518,029

(22) PCT Filed: Oct. 6, 2015

(86) PCT No.: PCT/EP2015/073032
§ 371 (c)(1),
(2) Date: Apr. 10, 2017

(87) PCT Pub. No.: WO2016/055465
PCT Pub. Date: Apr. 14, 2016

(65) Prior Publication Data
US 2018/0266352 A1    Sep. 20, 2018

(30) Foreign Application Priority Data

Oct. 8, 2014 (DE) .......... 10 2014 220 400

(51) Int. Cl.
*F02D 41/10* (2006.01)
*F02D 17/02* (2006.01)
(Continued)

(52) U.S. Cl.
CPC ..... *F02D 41/1406* (2013.01); *F02D 13/0226* (2013.01); *F02D 17/02* (2013.01);
(Continued)

(58) Field of Classification Search
CPC .. F02D 41/1406; F02D 41/10; F02D 41/0002; F02D 41/0087; F02D 13/0226;
(Continued)

(56) References Cited

U.S. PATENT DOCUMENTS 6,980,901 B2   12/2005   Hartmann et al. ............ 701/101
7,085,647 B1 *  8/2006   Prucka ................ F02D 41/0087
                                                        701/114
(Continued)

FOREIGN PATENT DOCUMENTS

DE    102004017869 A1    11/2004   ............. F02D 37/02
DE     10340816 A1        3/2005   ............... F01N 9/00
(Continued)

OTHER PUBLICATIONS

German Office Action, Application No. 102014220400.3, 8 pages, dated Sep. 21, 2015.
(Continued)

*Primary Examiner* — Mahmoud Gimie
(74) *Attorney, Agent, or Firm* — Slayden Grubert Beard PLLC

(57) ABSTRACT

The present disclosure relates to internal combustion engines. The teachings thereof may be embodied in a method for determining a torque reserve for an internal combustion engine during a change of an operating state. The method may include: operating the internal combustion engine in the first operating state; determining a rotational speed; determining a torque; determining an air mass setpoint value based on the rotational speed and the torque in the second operating state; calculating a torque setpoint value depending on the rotational speed and the air mass setpoint value in the first operating state; and determining a
(Continued)

torque reserve for the transition from the first operating state to the second operating state using based on the torque and on the torque setpoint value.

8 Claims, 2 Drawing Sheets

(51) Int. Cl.
    *F02D 41/14*     (2006.01)
    *F02D 13/02*     (2006.01)
    *F02D 41/00*     (2006.01)
    *F02P 5/04*     (2006.01)

(52) U.S. Cl.
    CPC ......... *F02D 41/0002* (2013.01); *F02D 41/10* (2013.01); *F02P 5/045* (2013.01); *F02D 2200/1004* (2013.01); *F02D 2250/21* (2013.01); *F02D 2250/22* (2013.01)

(58) Field of Classification Search
    CPC ............ F02D 17/02; F02D 2200/1004; F02D 2250/21; F02D 2250/22; F02P 5/045
    USPC .................................................. 123/406.12
    See application file for complete search history.

(56) References Cited

U.S. PATENT DOCUMENTS

| | | | | |
|---|---|---|---|---|
| 2004/0112336 A1* | 6/2004 | Badillo | ................ | F02D 41/045 123/406.51 |
| 2005/0065705 A1* | 3/2005 | Hartmann | ........... | F02D 13/0226 701/102 |
| 2005/0109318 A1* | 5/2005 | Ichihara | ................ | F02D 11/105 123/406.45 |
| 2006/0102143 A1* | 5/2006 | Yagi | ...................... | F02D 11/105 123/339.11 |
| 2007/0010931 A1* | 1/2007 | Kraemer | .................. | F02D 37/02 701/109 |
| 2008/0305921 A1* | 12/2008 | Falkestein | ................ | B60K 6/48 477/3 |
| 2009/0107456 A1* | 4/2009 | Pallett | ..................... | F02D 37/02 123/299 |
| 2010/0057325 A1 | 3/2010 | Livshiz et al. | ................ | 701/102 |
| 2011/0041802 A1 | 2/2011 | Kar et al. | ..................... | 123/352 |
| 2011/0180037 A1* | 7/2011 | Blom | ...................... | F02D 17/02 123/406.2 |
| 2011/0253079 A1* | 10/2011 | Mallebrein | ............. | F02D 37/02 123/41.86 |
| 2011/0253101 A1* | 10/2011 | Mathews | ................. | F02P 5/045 123/406.27 |
| 2013/0054100 A1* | 2/2013 | Giencke | ................... | F02D 41/08 701/54 |
| 2015/0292785 A1* | 10/2015 | Watanabe | .............. | F02D 41/083 62/228.1 |

FOREIGN PATENT DOCUMENTS

| | | | | |
|---|---|---|---|---|
| DE | 102007005380 A1 | 8/2008 | ............ | F02D 41/00 |
| DE | 102010006642 A1 | 8/2011 | ............ | F02D 41/04 |
| JP | 2008128082 A | 6/2008 | ............ | F02D 13/06 |
| JP | 2010024963 A | 2/2010 | ............ | F02D 13/02 |
| WO | 2006/013139 A1 | 2/2006 | ............ | F02D 41/30 |
| WO | 2016/055465 A1 | 4/2016 | ............ | F02D 13/02 |

OTHER PUBLICATIONS

International Search Report and Written Opinion, Application No. PCT/EP2015/073032, 19 pages, dated Jan. 18, 2016.
Korean Notice of Allowance, Application No. 2018069167587, 3 pages, dated Oct. 12, 2018.

* cited by examiner

OPERATING METHODS FOR INTERNAL COMBUSTION ENGINES

CROSS-REFERENCE TO RELATED APPLICATIONS

This application is a U.S. National Stage Application of International Application No. PCT/EP2015/073032 filed Oct. 6, 2015, which designates the United States of America, and claims priority to DE Application No. 10 2014 220 400.3 filed Oct. 8, 2014, the contents of which are hereby incorporated by reference in their entirety.

TECHNICAL FIELD

The present disclosure relates to internal combustion engines. The teachings thereof may be embodied in a method for determining a torque reserve and to a control unit for carrying out the method.

BACKGROUND

DE 10 2010 006 642 A1 discloses a method and a system for controlling an internal combustion engine. The description covers determining a torque reserve and/or a rotational speed reserve. To this end, the torque reserve and/or the rotational speed reserve is determined based on a measured speed of an engagement and/or release of a clutch element which is connected to the internal combustion engine. As a result, the problem of start-up deficiency can be reduced despite a low consumption of the internal combustion engine.

SUMMARY

The teachings of the present disclosure may enable an improved method for determining a torque reserve. For example, methods for determining a torque reserve (TQIR) for an internal combustion engine (1) during a change of an operating state of the internal combustion engine (1) from a first operating state (a0) to a second operating state (a1), may include: the internal combustion engine (1) being operated in the first operating state (a0), a rotational speed (N) of the internal combustion engine (1) being determined, a torque (TQI) of the internal combustion engine being determined, an air mass setpoint value (LS) for a filling of the internal combustion engine (1) being determined using a second calculation process (51) in a manner which is dependent on the determined rotational speed (N) and is dependent on the determined torque (TQI), the second calculation process (51) taking into consideration a method of operation of the internal combustion engine (1) in the second operating state (a1), a torque setpoint value (TQIS) being calculated by way of a first calculation process (52) using the determined rotational speed (N) and using the calculated air mass setpoint value (LS), the first calculation process (52) taking into consideration a method of operation of the internal combustion engine (1) in the first operating state (a0), and a torque reserve (TQIR) for the transition from the first operating state (a0) of the internal combustion engine (1) to the second operating state (a1) being determined with the aid of a third calculation process (53) in a manner which is dependent on the determined torque (TQI) and on the calculated torque setpoint value (TQIS).

In some embodiments, the second calculation process (51) is carried out using a characteristic curve or a characteristic diagram, the characteristic curve or the characteristic diagram fixing a dependence of the air mass setpoint value (LS) for the second operating state (a1) of the internal combustion engine (1) in a manner which is dependent on the torque (TQI) and the rotational speed (N).

In some embodiments, the first calculation method (52) is carried out using a characteristic curve or a characteristic diagram, the characteristic curve or the characteristic diagram fixing a dependence of the torque setpoint value (TQIS) for the first operating state (a0) of the internal combustion engine (1) in a manner which is dependent on the air mass setpoint value (LS) and the rotational speed (N).

In some embodiments, the torque reserve (TQIR) is determined with the aid of the third calculation process (53) by way of a subtraction of the determined torque (TQI) from the torque setpoint value (TQIS).

In some embodiments, a check is made in a manner dependent on the determined torque reserve (TQIR) as to whether the torque reserve (TQIR) can be neutralized by way of an ignition angle adjustment, a change of the operating state not being carried out if the torque reserve (TQIR) cannot be carried out by way of the change of the ignition angle (ZW).

In some embodiments, the first operating state (a0) differs from the second operating state (a1) in terms of a different valve stroke of at least one inlet valve (E) of the internal combustion engine (1).

In some embodiments, the first operating state (a0) differs from the second operating state (a1) in terms of stopping or switching on one cylinder (5) of the internal combustion engine (1).

Some embodiments may include a control unit configured to carry out the method as described above.

BRIEF DESCRIPTION OF THE DRAWINGS

The invention will be explained in greater detail in the following text using the figures, in which.

DETAILED DESCRIPTION

Figure 1:
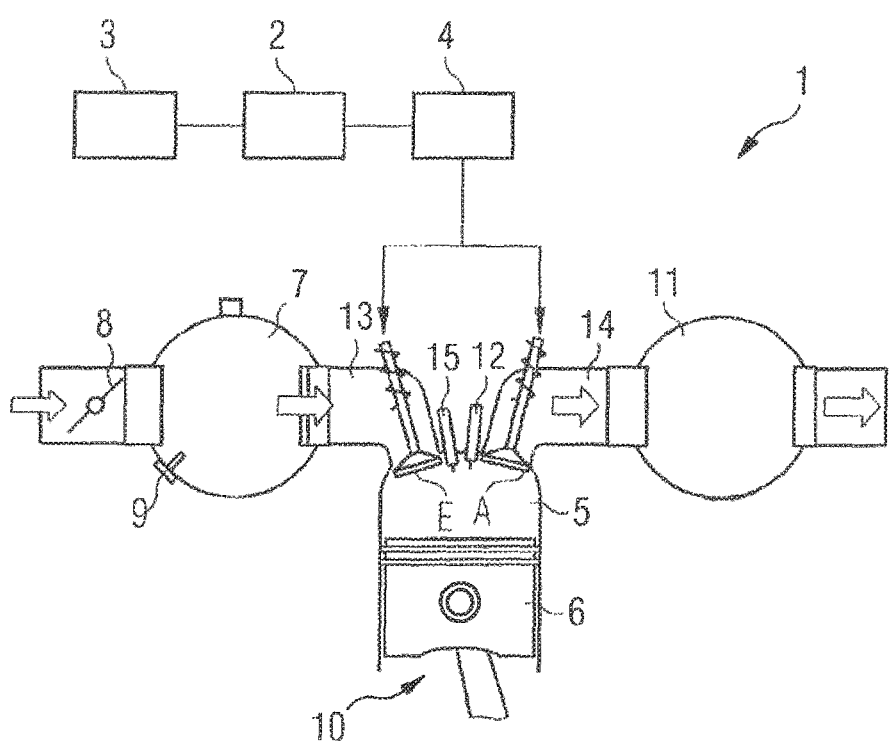
FIG. 1 shows a diagrammatic construction of an internal combustion engine, according to teachings of the present disclosure.

The methods described herein may enable determining the torque reserve more precisely before a switchover from a first operating state to a second operating state. In this way, a fuel consumption can be reduced.

In some embodiments, an air mass setpoint value is determined for the first operating state in a manner which is dependent on the rotational speed and on the torque of the internal combustion engine. A torque setpoint value is determined for the second operating state in a manner which is dependent on the determined air mass setpoint value and in a manner which is dependent on the determined rotational speed. The torque reserve is determined from the comparison between the torque setpoint value and the determined torque. A more precise determination of the torque reserve is possible in this way. As a result, an unnecessary provision of a torque reserve or an excessively low provision of a torque reserve is avoided. Therefore, a transition between the operating states of the internal combustion engine is made possible, without juddering occurring and/or without an unnecessarily great quantity of fuel being consumed.

In a manner which is dependent on the embodiment which is used, a first calculation process is used for determining the air mass setpoint value. The first calculation process can be carried out, for example, using a characteristic curve or using a first characteristic diagram. The characteristic curve and the characteristic diagram may be determined experimentally, for example, and stipulate corresponding values for the air mass setpoint value in a manner which is dependent on the rotational speed and the torque. The first calculation process takes the method of operation of the internal combustion engine in the first operating state into consideration. In a corresponding way, the first characteristic curve or the first characteristic diagram likewise takes the behavior of the internal combustion engine in the first operating state of the internal combustion engine into consideration.

In a further embodiment, a second calculation process is used for determining the torque setpoint value. The second calculation process can determine the torque setpoint value using a second characteristic curve or using a second characteristic diagram, in a manner dependent on the rotational speed and/or on the air mass setpoint value. The second characteristic curve or the second characteristic diagram may be determined experimentally, for example, and represent the behavior of the internal combustion engine in the second operating state. Therefore, a precise determination of the torque reserve can be achieved.

In some embodiments, the torque reserve is determined in a manner dependent on the determined torque setpoint value and/or the determined torque. The determination can take place in the form of a subtraction. Other calculation processes or determination processes can also be used depending on the selected embodiment. In particular, an evaluation by way of factors can be provided.

In some embodiments, a check is made before the switchover of the internal combustion engine from the first operating state to the second operating state as to whether the determined torque reserve can be neutralized with the aid of an ignition angle adjustment, that is to say can be reduced to the value zero. If this is not the case, either a lower torque reserve can be provided, depending on the selected embodiment, or a transition of the internal combustion engine from the first to the second operating state can be suppressed and the internal combustion engine can continue to be operated in the first operating state. To this end, corresponding tables, characteristic curves or calculation processes may be employed to determine whether the determined torque reserve at the present operating point of the internal combustion engine can be neutralized in the second operating state with the aid of an ignition angle adjustment.

In some embodiments, the first and the second operating state consist, for example, in valve strokes of different height of the inlet and/or the outlet valve. The valve strokes of different height bring about filling quantities of fresh air of different magnitude. In a further embodiment, the first and the second operating state can differ in terms of a different number of active cylinders or in terms of stopping or switching on one cylinder of the internal combustion engine. The torque or the torque reserve is also influenced as a result.

FIG. 1 shows a diagrammatic illustration of a part detail of an internal combustion engine of a vehicle. An internal combustion engine 1 may include at least one cylinder 5, in which a piston 6 moves up and down in an alternating manner during the combustion process. Some embodiments may include a plurality of cylinders, in particular four or six cylinders. The cylinders are of identical configuration, only one cylinder 5 being described in the following text.

The cylinder 5 may be connected to an inlet duct 13 connected to the combustion chamber of the cylinder 5 via opening or closure of an inlet valve E. Furthermore, the combustion chamber of the cylinder 5 is connected via an outlet valve A to an outlet duct 14. The combustion chamber of the cylinder 5 is connected to the outlet duct 14 or is separated from the outlet duct 14 in a manner which is dependent on opening or closure of the outlet valve A. Via the outlet duct 14, combustion exhaust gases are discharged to the outside via an exhaust gas system 11.

The inlet duct 13 is connected on the input side to an intake manifold 7 which can be opened or closed to a greater or lesser extent by a throttle flap 8 in a manner which is dependent on the flap position. More or less air is sucked in during a combustion operation depending on the opening cross section of the throttle flap 8. There is an intake manifold pressure p in the intake manifold 7, which can be measured by way of an intake manifold pressure sensor 9. The air mass of an air flow which is sucked in therefore passes via the throttle flap 8, the intake manifold 7 and, in the case of an open inlet valve E, via the inlet duct 13 into the combustion chamber of the cylinder 5.

Furthermore, the internal combustion engine may include an injector 12, via which a defined fuel quantity can be injected directly into the cylinder 5 at a stipulated time. During the injection, the fuel is swirled with the air which is sucked in and is burned after an ignition with the aid of a spark plug 15 and is discharged as exhaust gas via the open outlet valve A and the exhaust gas system 11.

Some embodiments may include a control unit 2 connected to a memory 3. The control unit 2 is connected via a sensor line to the intake manifold pressure sensor 9, a control line to the throttle flap 8, via a further control line to the injector 12, and via a third control line to an ignition system (not shown) which supplies the spark plug with an ignition current at an ignition time which is stipulated by the control unit 2.

Control programs for controlling the transition from a first operating state of the internal combustion engine to a second operating state of the internal combustion engine are stored in the memory 3. Control programs may determine a corresponding torque dependent on a driver request, in particular an accelerator pedal position and a rotational speed. To this end, corresponding programs are stored for controlling the opening cross section of the throttle flap 8, fixing the injection quantity, and fixing the ignition time, the opening times of the inlet valve, and the opening times of the outlet valve.

The different operating states can consist of, for example, a smaller opening stroke of the inlet valve and/or a smaller opening stroke of the outlet valve are/is stipulated in the first operating state than in the second operating state. Furthermore, a lower number of cylinders can be active in the first operating state than in the second operating state. An active cylinder denotes a cylinder which participates in a combustion process. For example, individual cylinders can be switched off in a manner which is dependent on the load requirement and on the operating point of the internal combustion engine.

Some embodiments may include an actuator 4 connected to the control unit 2. On the output side, the actuator 4 acts on the inlet valve E and, depending on the selected embodiment, also on the outlet valve A. By way of the actuator 4, the control unit can control the opening stroke of the inlet valves E and/or the outlet valves A differently, for example, in a manner which is dependent on a load requirement. A smaller or larger filling quantity of fresh air passes into the combustion chamber of the cylinder depending on the stroke height of the inlet valve E and/or the outlet valve A. In the case of a change in the stroke height of the inlet valve, the filling quantity of the combustion chamber can therefore change rapidly. As a result, the torque which is provided by the internal combustion engine changes rapidly.

Figure 2:
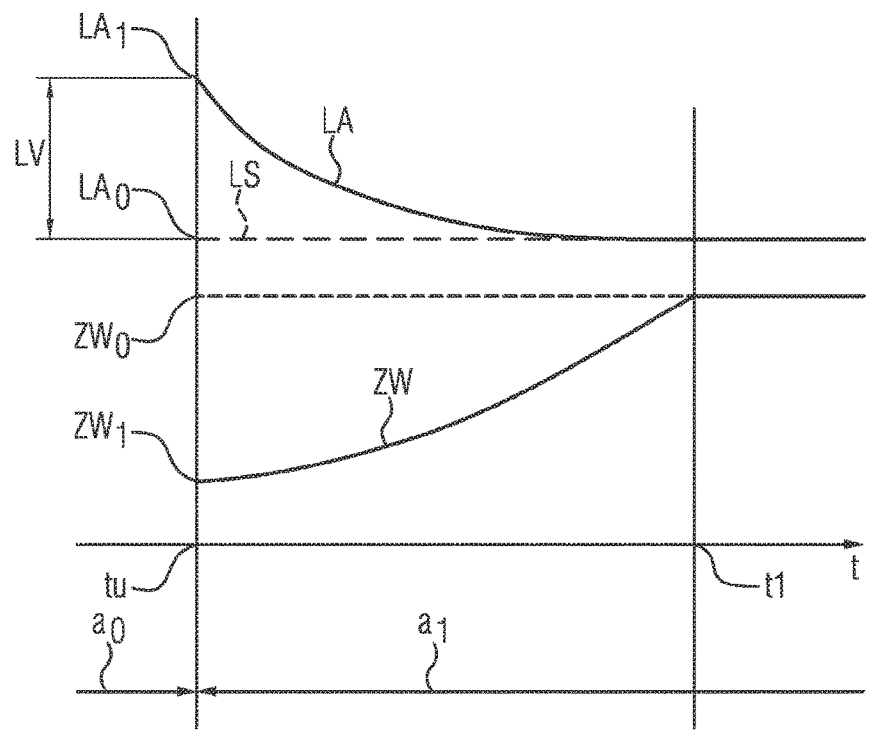
FIG. 2 shows a transition from the first to the second operating state, according to teachings of the present disclosure.

FIG. 2 is a schematic diagram showing the profile of the filling quantity of fresh air LA sucked in and the profile of the ignition time and the ignition angle ZW plotted against the time t for two operating states of the internal combustion engine. In the first operating state of the internal combustion engine, a zeroth filling quantity $LA_0$ for a combustion operation of the cylinder is sucked in via a corresponding position of the throttle valve and the inlet valves and the outlet valves. In addition, a zeroth ignition time $ZW_0$ is fixed by the control unit using the stipulated control programs, and the ignition of the air/fuel mixture is controlled accordingly.

A change of the operating state of the internal combustion engine from the first operating state to the second operating state takes place at the switchover time tu. Here, for example, the opening stroke of the inlet valve and/or the opening stroke of the outlet valve are/is changed in such a way that the filling quantity of fresh air rises abruptly, to be precise to the first value LA1. Here, the air mass jump is denoted by the designation LV. At the same time, the ignition time is adjusted in the retarded direction to the first value $ZW_1$, and a stipulated torque reserve is therefore provided.

In the following chronological sequence, the filling quantity is reduced again and the ignition time is adjusted again in the advanced direction to the setpoint value $ZW_0$ by the control unit 2. The setpoint values for the air quantity and the ignition time may represent an optimum operating point for a desired torque and a rotational speed of the internal combustion engine, at which optimum operating point as little fuel as possible is consumed. From the first time t1, the torque reserve provided by way of the transition from the first operating state a0 to the second operating state a1 is balanced again. The increase in the torque which is provided by way of the increase in the filling quantity of the fresh air is neutralized by way of the corresponding adjustment of the ignition time in the direction of a retarded ignition time, and therefore the torque reserve is neutralized.

Figure 3:
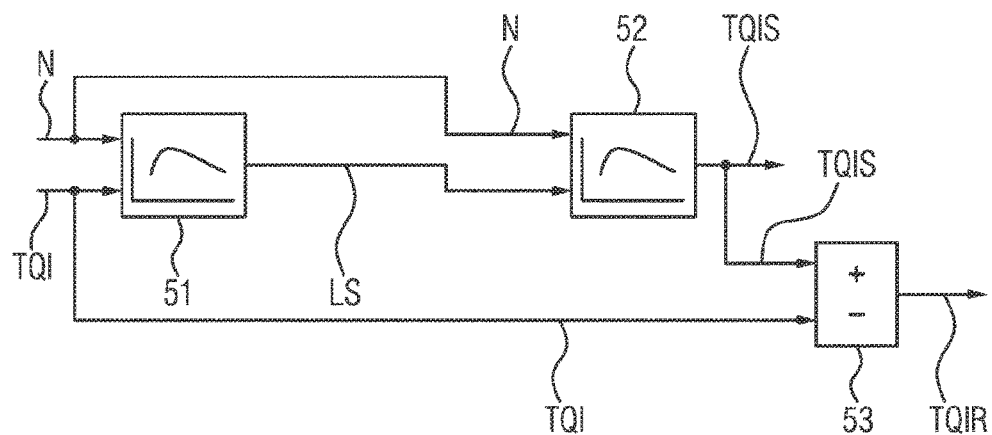
FIG. 3 shows a diagrammatic illustration of a method for determining the torque reserve according to teachings of the present disclosure.

Some embodiments may include the program sequence from FIG. 3, which may enable calculating the torque reserve set by way of the change of the operating state more precisely. It is possible in this way to determine the ignition angle which is required for the neutralization of the torque reserve earlier and more precisely. In particular, the corrected ignition time may be calculated before the transition from the first operating state to the second operating state, with the result that the corrected ignition angle is already available during the transition.

FIG. 3 shows a method for determining the torque reserve for a transition of the internal combustion engine from a first operating state to a second operating state. Before the transition from the first operating state to the second operating state, the rotational speed N of the internal combustion engine in the first operating state is detected by the control unit. At the same time, the torque TQI of the internal combustion engine in the first operating state is detected by the control unit. The rotational speed and the torque can be measured or determined or calculated in a manner which is dependent on further parameters.

While in the first operating state, the control unit 2 determines an air mass setpoint value LS for the internal combustion engine in the second operating state by way of a second calculation process 51 in a manner which is dependent on the rotational speed N and on the torque TQI. To this end, corresponding calculation processes or characteristic diagrams or characteristic curves can be provided, by way of which the air mass setpoint value for the internal combustion engine for the second operating state can be determined in a manner which is dependent on the rotational speed and on the torque. To this end, the second calculation process 51 takes into consideration the method of operation of the internal combustion engine in the second operating state.

Subsequently, during the first operating state, a torque setpoint value TQIS generated by the internal combustion engine in the first operating state is determined by way of a first calculation process 52 by the control unit 2 in a manner which is dependent on the rotational speed N and the air mass setpoint value LS. The determination can consist, for example, in a calculation process, a use of a characteristic diagram or a characteristic curve, and can depict the method of operation of the internal combustion engine in the first operating state.

Subsequently, in a third calculation process 53, a torque reserve TQIR is calculated in a manner which is dependent on the torque setpoint value TQIS which was determined in the first calculation process and the torque TQI which was determined by the control unit. The calculation can lie in a simple subtraction in one simple embodiment. The torque reserve which is determined in the third calculation process 53 is set by the control unit 4 by the control unit 4 transferring the internal combustion engine from the first operating state into the second operating state. As has already been described above, the difference between the first and the second operating state can consist, for example, in different stroke heights of the inlet valves and/or the outlet valves.

Depending on the embodiment, the control unit 2 can check on the basis of the torque reserve which is determined in the third calculation process whether the torque reserve can be neutralized with the aid of an ignition adjustment. If this is not the case, the control unit can suppress the switchover from the first operating state to the second operating state, depending on the selected embodiment.

The first and the second calculation process are determined for the defined operating point of the internal combustion engine and/or in a manner which is dependent on a requested torque of the driver. To this end, the corresponding calculation processes and/or characteristic curves or characteristic diagrams are stored in the memory 3 of the control unit 2.

LIST OF DESIGNATIONS

1 Internal combustion engine
2 Control unit
3 Memory
4 Actuator
5 Cylinder
6 Piston
7 Intake manifold
8 Throttle flap
9 Intake manifold pressure sensor
11 Exhaust gas system
12 Injector
13 Inlet duct
14 Outlet duct
15 Spark plug 51 Second calculation process
52 First calculation process
53 Third calculation process
A Outlet valve
a0 First operating state
a1 Second operating state
E Inlet valve
LA Fresh air
$LA_0$ Zeroth filling quantity
$LA_1$ Filling quantity of fresh air
LS Air mass setpoint value
LV Air mass jump
N Rotational speed
t Time
t1 First time
tu Switchover time
TQI Torque TQIR Torque reserve
TQIS Torque setpoint value
ZW Ignition angle
$ZW_0$ Zeroth ignition time

What is claimed is:

1. A method for determining a torque reserve for an internal combustion engine during a transition of an operating state of the internal combustion engine from a first operating state to a second operating state, the method comprising:
    operating the internal combustion engine in the first operating state;
    determining a rotational speed of the internal combustion engine;
    determining a torque of the internal combustion engine;
    determining an air mass setpoint value for a filling of the internal combustion engine based on the determined rotational speed and on the determined torque and accounting for operation of the internal combustion engine in the second operating state;
    calculating a torque setpoint value based on the determined rotational speed and the calculated air mass setpoint value and accounting for operation of the internal combustion engine in the first operating state; and
    determining a torque reserve for the transition from the first operating state to the second operating state based on the determined torque and on the calculated torque setpoint value.

2. The method as claimed in claim 1, wherein determining an air mass setpoint value for a filling of the internal combustion engine includes using a characteristic curve or a characteristic diagram, the characteristic curve or the characteristic diagram fixing a dependence of the air mass setpoint value for the second operating state of the internal combustion engine which is dependent on the torque and the rotational speed.

3. The method as claimed in claim 1, wherein calculating a torque setpoint value includes using a characteristic curve or a characteristic diagram, the characteristic curve or the characteristic diagram fixing a dependence of the torque setpoint value for the first operating state of the internal combustion engine dependent on the air mass setpoint value and the rotational speed.

4. The method as claimed in claim 1, wherein determining a torque reserve includes subtracting the determined torque from the torque setpoint value.

5. The method as claimed in claim 1, further comprising checking whether the torque reserve can be neutralized by way of an ignition angle adjustment, and not carrying out a change of the operating state if the torque reserve cannot be enacted by the adjustment of the ignition angle.

6. The method as claimed in claim 1, wherein the first operating state differs from the second operating state in terms of a different valve stroke of at least one inlet valve of the internal combustion engine.

7. The method as claimed in claim 1, wherein the first operating state differs from the second operating state in terms of stopping or switching on one cylinder of the internal combustion engine.

8. A control unit programmed to determine a torque reserve for an internal combustion engine during a transition of an operating state of the internal combustion engine from a first operating state to a second operating state, by:
    operating the internal combustion engine in the first operating state;
    determining a rotational speed of the internal combustion engine;
    determining a torque of the internal combustion engine;
    determining an air mass setpoint value for a filling of the internal combustion engine based on the determined rotational speed and on the determined torque and accounting for operation of the internal combustion engine in the second operating state;
    calculating a torque setpoint value based on the determined rotational speed and the calculated air mass setpoint value and accounting for operation of the internal combustion engine in the first operating state; and
    determining a torque reserve for the transition from the first operating state to the second operating state based on the determined torque and on the calculated torque setpoint value.

* * * * *